May 20, 1941.　　　　　C. FERRO　　　　　2,242,425
VEHICLE WHEEL
Filed Sept. 23, 1940　　　2 Sheets-Sheet 1
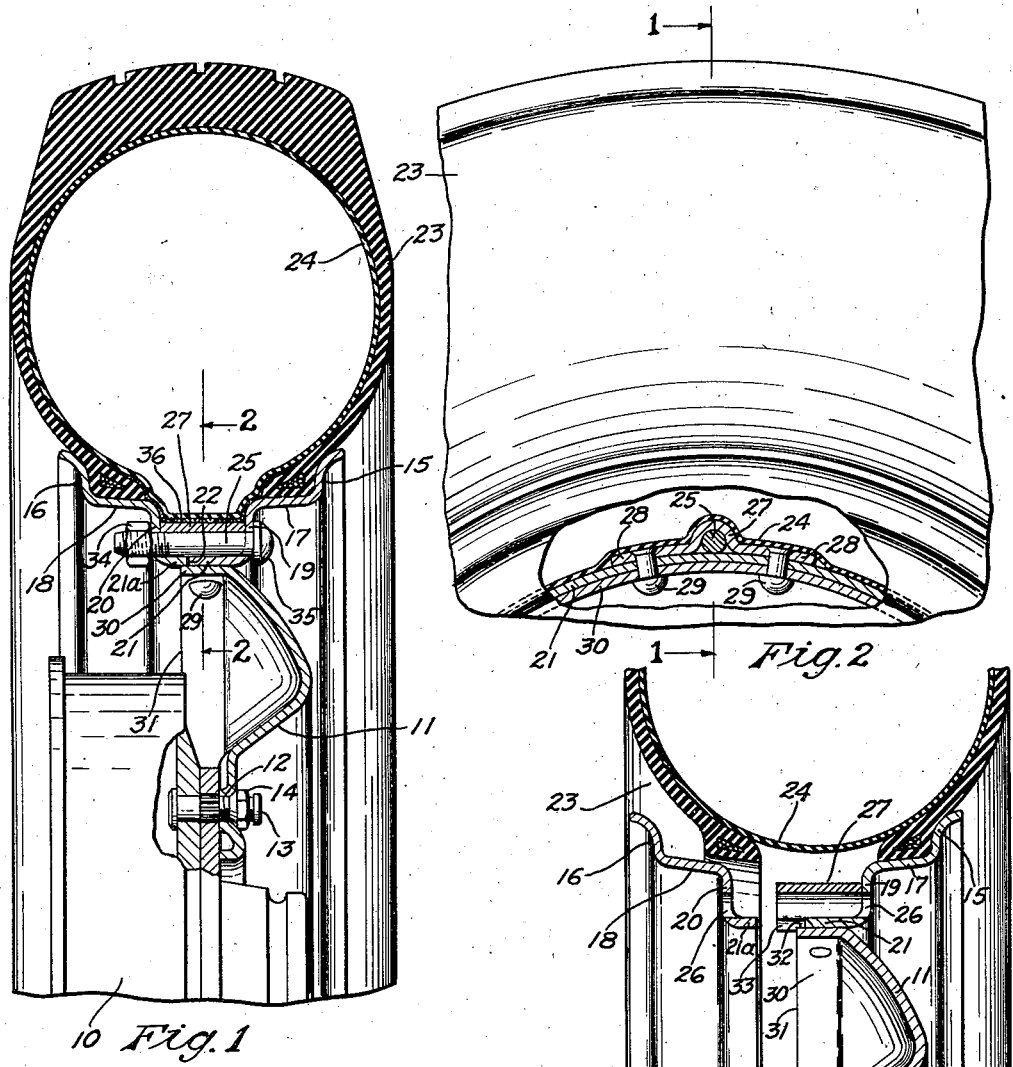
Fig. 1
Fig. 2
Fig. 3
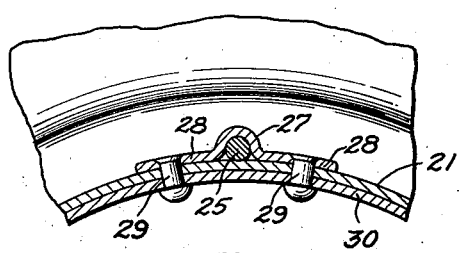
Fig. 4
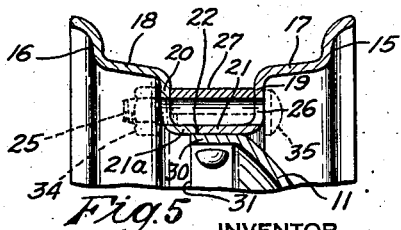
Fig. 5
INVENTOR
Casimiro Ferro
BY
Wooster & Davis
ATTORNEYS.

May 20, 1941.  C. FERRO  2,242,425
VEHICLE WHEEL
Filed Sept. 23, 1940  2 Sheets-Sheet 2
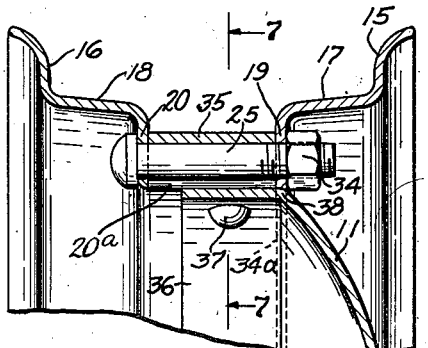
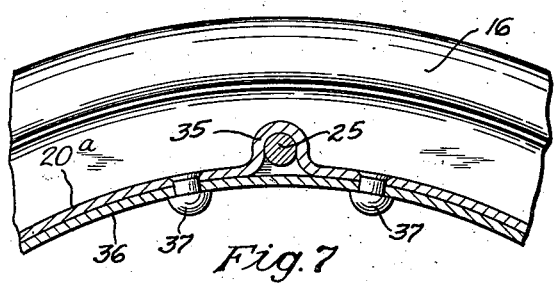
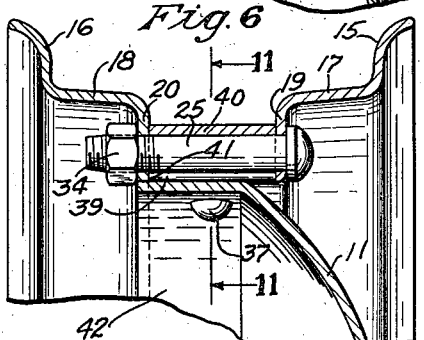
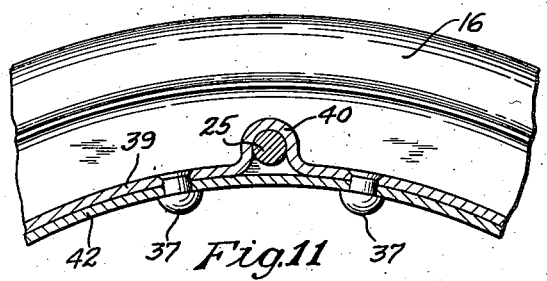
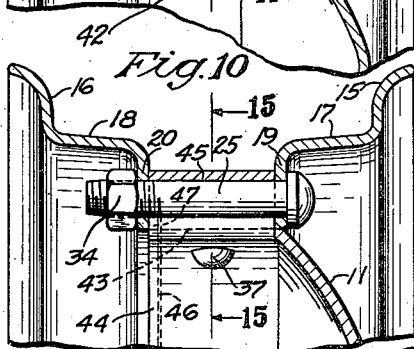
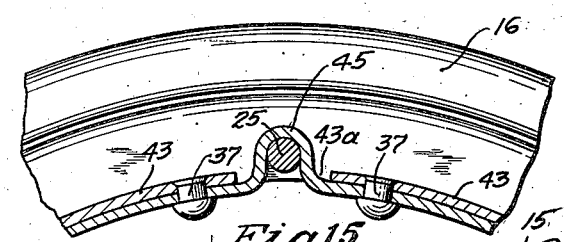
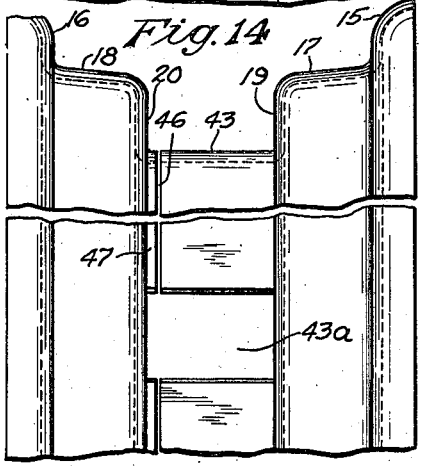
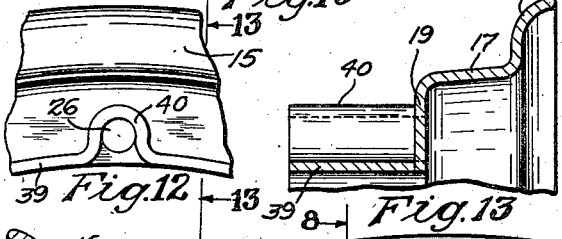
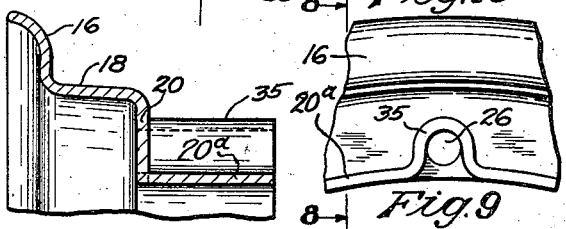
INVENTOR
Casimiro Ferro
BY
Wooster & Davis
ATTORNEYS.

Patented May 20, 1941

2,242,425

UNITED STATES PATENT OFFICE 2,242,425

VEHICLE WHEEL

Casimiro Ferro, West New Brighton, Staten Island, N. Y.

Application September 23, 1940, Serial No. 357,911

9 Claims. (Cl. 152—405)

This invention relates to vehicle wheels, and particularly to a detachable wheel section including a drop center tire rim of standard shape. It is the principal object of the invention to provide a simple and improved construction for such a rim whereby the opposite flanges of the rim can be easily separated to facilitate removal and application of the tire without requiring prying of the casing over the rim of the flanges.

With the foregoing and other objects in view I have devised a construction illustrated in the accompanying drawings forming a part of this specification. It is, however, to be understood that I am not limited to the specific details shown but may employ various changes and modifications within the scope of the invention.

In these drawings:

Fig. 1 is a section through the rim portion of a vehicle wheel substantially on line 1—1 of Fig. 2 with the central supporting section in elevation;

Fig. 2 is a side elevation of a portion thereof with a part of the flange broken away to show the construction of the securing means fastening the separable sections together, the flange section being substantially on line 2—2 of Fig. 1, and the canvas strip between the inner tube and the bottom wall of the rim being omitted;

Fig. 3 is a transverse section substantially on line 1—1 of Fig. 2 showing one rim section separated from the other;

Fig. 4 is a detail section substantially on line 2—2 of Fig. 1 but with the tire removed;

Fig. 5 is a transverse section similar to Fig. 3 with the tire removed but the two sections of the rim in their normal assembled position;

Fig. 6 is a transverse section through the rim portion of a wheel showing a modified construction;

Fig. 7 is a section substantially on line 7—7 of Fig. 6;

Fig. 8 is a section of the left hand portion of the rim of Fig. 6 taken substantially on line 8—8 of Fig. 9;

Fig. 9 is an elevation of a portion of the rim section looking from the right of Fig. 8;

Fig. 10 is a transverse section of the rim portion of the wheel showing another modification;

Fig. 11 is a section substantially on line 11—11 of Fig. 10;

Fig. 12 is a side elevation of a portion of the right hand section of the rim of Figs. 10 and 11 looking toward the right of Fig. 13;

Fig. 13 is a transverse section of this portion of the rim substantially on line 13—13 of Fig. 12;

Fig. 14 is a transverse section of the rim portion of the wheel showing still another modification;

Fig. 15 is a section thereof substantially on line 15—15 of Fig. 14; and

Fig. 16 is a side elevation of a portion of the rim of Fig. 15 removed from the central supporting member.

The wheel shown comprises an inner or supporting section which may be the brake drum 10, or other element connected therewith, to which the outer removable section is detachably connected. This in the usual construction comprises a web portion 11 of any suitable shape to give it the required strength and stiffness and having a series of openings 12 therethrough for securing bolts 13 mounted on the supporting section 10. These openings 12 may be ordinary round openings through which the bolts 13 extend and then the web is clamped to the supporting member by nuts 14. It is, however, preferred to use keyhole shaped openings substantially as shown in my prior application Serial Number 318,671, filed February 13, 1940, in which the narrow part of the opening is of a width substantially the diameter of the bolt 12 and the wider portion is sufficiently large to permit passage of the nut 14. By turning the web 11 to bring the bolts into the narrow portion of the keyhole shaped openings and then setting up the nuts 14 the removable section is effectively clamped to the inner section. The outer or removable section can be easily removed by loosening the bolts 14, then rotating the outer section including the web 11 a short distance to bring the bolts into the wider portions of the openings in which the outer section may be drawn outwardly away from the supporting section 10 without completely removing the nuts or bolts.

The rim proper is mounted on an outer portion of the web 11. This rim comprises two laterally spaced flanges 15 and 16 and at the inner edges of these flanges are substantially horizontal inwardly extending portions 17 and 18. Extending radially inward from the inner edges of these portions 17 and 18 are laterally spaced substantially parallel radial portions 19 and 20, and connecting the inner edges of these radial portions is a substantially horizontal portion or web 21. This portion 21 is cut or separated at 22 so that the flanges 15 and 16 may be laterally separated to permit easy removal of the tire from the rim and as easy application of the tire to the rim. Thus as shown in Fig. 3 the flange 16 and the connection portions 18 and 20 are separated from flange 15 and can be entirely removed. It will be seen this frees the tire casing 23 and the tube 24 so that they can be easily lifted from the other flange section 16, or the section 15 may be removed from the tire as desired. It will, however, be seen that although the rim comprises two separable sections it has the regular drop center shape in cross section.

The two rim sections including the flange portions 15 and 16 and the portions 17 to 21 are detachably connected together by bolts 25 extending transversely between the radial portions 19 and 20. These portions have openings 26 for passage of the bolts, and the bolts are also held against lateral movement by brackets 27 extending transversely between the radial portions 19 and 20. These brackets may be constructed in different ways, but the simplest is merely a strip of metal having bases 28 riveted or otherwise fastened to the portion 21 as indicated at 29 and the central portion looped over and embracing the bolt 25. This will securely hold the bolt against lateral movement relative to either rim section and prevent relative turning of the rim sections. This strip 28 is preferably of substantially the same gauge or thickness as the portion 21, but of course this is not necessary. Also, as shown in Figs. 1, 3 and 5, the width of this bracket 27 is the same as the distance between the radial portions 19 and 20 so that when the rim sections are in assembled relation and secured by the bolts 25 the radial portions 19 and 20 seat on and are supported by the ends of these brackets and therefore are always held in the proper spaced relation and the rim sections cannot be bent out of shape by tightening the bolts 25 too much. There may be a slight clearance between the edges at the line of separation 22 to insure that the radial portions 19 and 20 seat on the opposite ends of the brackets 27. The connecting portion 21 may be formed in one piece with the web 11, or as in the common construction the web 11 may have a flange 30 to which the portion 21 is riveted or otherwise fastened.

It is also preferred that the line of separation 22 be spaced back a short distance from the free edge 31 of the flange 30 as shown in Figs. 1, 3 and 5 at 32. This permits the free edge of the portion 21a on the other rim section to overlap the flange 30 somewhat and thus properly center the removable rim section with respect to the other section and maintain it in this central portion. This centering is also assisted by the base portions 28 of the brackets 27 overhanging the free edge of the portion 21 as shown at 33, Fig. 3, so as to overlap the portion 21a of the removable section.

To remove a tire from the rim the removable section of the wheel is removed from the central support 10 after loosening the nuts 14 as previously described. This removable wheel section may then be placed flat on a horizontal support such as the floor or pavement, and after the tire has been deflated the nuts 34 of the bolts 25 removed. Then the section comprising the flange 16 may be lifted upwardly away from the other section as indicated in Fig. 3. Then the tire may be lifted from the other or lower section having the flange 15, or this section may be merely dropped down from the tire. Mounting a tire on the rim is just as simple, as all that is necessary is to apply the two sections of the rim to the opposite sides of the tire or to apply the tire to the section having the flange 15 and then placing the other section having the flange 16 in position thereon and tightening up the bolts 25. The tire can then be inflated and used in the usual manner. It will thus be seen that the tire may be easily applied to and removed from the rim without the necessity of prying it over the edge of the rim by the use of tire irons or similar implements.

The bolts 25 do not mar the appearance of the wheel because, although their heads 35 are on the front face of the wheel, they are inconspicuous and not objectionable, or if preferred they can be made practically invisible by countersinking them in the radial portion 19. The brackets 27 projecting above the bottom portion 21 are not objectionable because the tube 24 readily adjusts itself to the contour of these brackets as indicated in Fig. 2, and these brackets are entirely concealed. The tire may be used either with or without the narrow canvas strip 36 as desired. This canvas strip is shown in place in Fig. 1 but is omitted in the other figures.

It will be seen this construction and arrangement does not change the fundamental shape of the standard drop center rim because the line of separation 22 is in the portion 21 at the bottom of the drop center. Therefore the present designs do not have to be changed. Also, as the connecting means for the separable rim sections comprises the bolts 25 which extend between the radial portions 19 and 20 this does not require changing of the shape or design of the drop center rim or the addition of inwardly extending flanges, and the brackets 27 effectively support the rim sections and maintain the bolts in proper position. These brackets and bolts add very little additional weight to the rim, and it is not sufficient to be objectionable.

From the above it will be seen that in the form shown in Figs. 1 to 5 the bracket 27 is a separate member secured to the bottom or central horizontal wall of the rim. In the forms shown in Figs. 6 to 13 this bracket or equivalent member is secured to the bottom or central horizontal wall by being formed in one piece with it, while in the form of Figs. 14 to 16 it is formed in one piece with the flange of the inner or central supporting web portion of the wheel. In all forms one rim section and the brackets are rigidly secured together or attached so they in effect form an integral structure, and in the specification and claims the term "integral" is used in a generic sense as including all these forms shown.

Referring first to Figs. 6 to 9, inclusive, the rim comprises the two flanges 15 and 16, the horizontal portions 17 and 18, the inwardly or radially extending side portions 19 and 20 which are spaced laterally from each other in substantially parallel relation and have extending between their inner edges the bottom or central horizontal wall portion 20a corresponding to the central wall portion 21 of Fig. 1. In this construction however this central wall portion is integral with the side wall 20 and extends to the opposite side wall 19 which is separable therefrom at its inner wall, the line of separation being indicated at 34a. At spaced intervals this central wall 20a is cut where it joins the side wall 20 and then the portion opposite this cut is forced outwardly to form the loop 35 which comprises a bracket corresponding to the bracket 27 in the form of Figs. 1 to 5. The opposite ends of these brackets form supports or seats for the side walls 20 and 19, and the bolt 25 extends through this bracket and clamps the side walls against the opposite ends of this bracket the same as in the first form. The rim is fastened to the flange 36 of the central web portion 11 by any suitable means such as the rivets 37. By taking off the nuts 34 of the bolts the right hand section of the rim comprising the walls 15, 17 and 19 may be removed permitting easier removal of the tire. In this construction the flange 36 of the central supporting web 11 may be made wider so as to extend under the inner edge of the side wall 19 as shown at 38 so as to form a guide and centering means for the removable section of the rim to facilitate placing it in proper position. The bolt 25 as in the first form, passes through openings in the side walls 19 and 20 as well as the brackets 35. These openings in the side walls correspond to the openings 26 as shown in Figs. 3 and 5.

The construction of Figs. 10, 11, 12 and 13 is the same as that of Figs. 6 and 9 except that the central horizontal wall portion 39 of the rim is integral with the right hand section of the rim comprising the wall portions 15, 17 and 19. This central portion is cut from the wall 19 at spaced points and forced outwardly to form the bracket or loop 40 corresponding to the bracket or loop 35. As in the other form this bracket extends between the side walls 19 and 20 and the bolt 25 passes through this bracket or loop and openings in the side walls 19 and 20 to clamp the side walls against the opposite ends of this bracket, the same as in the other form. The line of separation between the wall 20 and the central wall 39 is indicated at 41. The flange 42 of the central supporting portion 11 may be extended beyond the free edge of the central horizontal wall 39 and under the inner edge of the side wall 20 as shown in Fig. 10 so as to guide and center the removable section of the rim comprising the wall 16, 18 and 20. By removing the nuts 34 this section may be removed to permit easy removal of the tire as in the other forms.

In the forms shown in Figs. 14 to 16 the central horizontal wall portion 43 of the rim corresponding to the portions 21, 20a and 39 of the other forms is provided at suitable spaced intervals with transverse openings or notches 43a extending between the side walls 19 and 20. This central wall is secured to a flange 44 of the central supporting web portion 11 of the wheel by any suitable means as the rivets 37, but this flange 44 is of a width at least equal to the distance between the side walls 19 and 20. This flange is cut from the web 11 opposite the openings 43a and then the wall of this flange 44 is forced outwardly to form the brackets or loops 45 corresponding to the brackets or loops 27, 35 and 40 of the other forms. These brackets, however, being integral with the flange 44 extend outwardly through the notches or openings 43a so as to be located between the side walls 19 and 20 of the separable sections of the rim and to form seats at their opposite ends against which these side walls are clamped by the bolts 25 passing through the brackets 45 and openings in the side walls 19 and 20. The central horizontal wall 43 may be integral with either the side wall 19 or the side wall 20, but in the present construction, it is shown integral with wall 19 and the line of separation between the two sections of the brim is shown at 46 a short distance inwardly from the side wall 20. This provides a short horizontal wall 47 which may telescope over the free edge portion of the flange 44 so that this flange forms a guide and centering means to facilitate properly locating the removable section of the rim comprising the wall 16, 18 and 20. As in the other forms removal of the nuts 34 will permit removal of this removable section to allow easy removal of the tire from the rim.

It will be seen from the above that all forms operate in the same manner and that the tire may be easily and quickly applied to and removed from the rim without the necessity of prying it over the side flanges of the rim. It will also be evident that in each form substantially the standard design of the present drop center type of rim and the present design of the central web supporting portion of the wheel may be used. The forms of Figs. 6 to 16 add nothing to the weight of the wheel except that of the bolts 25, while in the forms of Figs. 14 to 16 the weight of the metal removed in forming the openings 43a may substantially compensate for the weight of the bolts.

Having thus set forth the nature of my invention, what I claim is:

1. In a vehicle wheel, a removable outer section including a drop center tire rim comprising rim sections including spaced side flanges and which are laterally separable between the flanges to permit removal of a tire, said rim including substantially horizontal portions extending inwardly from the flanges, laterally spaced substantially parallel portions extending radially inward from the inner edges of said second portions and a substantially horizontal portion connecting the inner edges of said radial portions, bolts extending transversely through the spaced radial portions to detachably connect the rim sections together, and transverse holders for the bolts extending between said radial portions and integral with one rim section and forming supporting seats at their opposite ends for said radial portions.

2. In a vehicle wheel, an outer removable section including a drop center tire rim comprising rim sections including spaced side flanges and which are laterally separable between the flanges to permit removal of a tire, substantially horizontal portions extending inwardly from said flanges, laterally spaced substantially parallel portions extending radially inward from the inner edges of said second portions and a substantially horizontal portion connecting the inner edges of said radial portions, bolts extending transversely between the radial portions to detachably secure the rim sections together, and supporting brackets for the bolts integral with one rim section and extending transversely between the radial portions and forming seats for said portions at their opposite ends.

3. In a vehicle wheel, an outer removable section including a drop center tire rim comprising rim sections including spaced side flanges and which are laterally separable between the flanges to permit removal of a tire, substantially horizontal portions extending inwardly from said flanges, laterally spaced substantially parallel portions extending radially inward from the inner edges of said second portions and a substantially horizontal portion connecting the inner edges of said radial portions in which the line of separation is located, brackets rigidly secured to said latter horizontal portion and forming seats at their opposite ends for the radial portions, and bolts extending transversely through said brackets and the said radial portions to clamp said portions against the ends of the brackets and to detachably secure the rim sections together.

4. In a vehicle wheel, an outer removable section including a drop center tire rim comprising rim sections including spaced side flanges and which are laterally separable between the flanges to permit removal of a tire, substantially horizontal portions extending inwardly from said flanges, laterally spaced substantially parallel portions extending radially inward from the inner edges of said second portions and a substantially horizontal portion connecting the inner edges of said radial portions in which the line of separation is located, a supporting web having a horizontal flange at the inner side of the said latter horizontal portion of the rim and to which said horizontal portion is secured, the free end of said latter flange projecting beyond the line of separation so that the central portion on the removable section of the rim overlaps the free edge of said flange to center the removable section of the rim on the other section, and means for detachably securing the flanges against separation.

5. In a vehicle wheel, an outer removable section including a drop center tire rim comprising laterally separable sections, said rim including laterally spaced flanges, substantially horizontal portions extending inwardly from said flanges, laterally spaced substantially parallel portions extending inwardly from the inner edges of said second portions and a substantially horizontal bottom and central portion extending between the inner edges of said radial portions and in which the line of separation between the sections is located, brackets having base portions secured to said central portion and extending transversely between said radial portions and forming seats for said portions on the opposite ends thereof, bolts extending through the brackets and said radial portions to detachably secure the sections together, and said base portions of the brackets extending beyond the line of separation between the sections and overlapping the central portion on the removable section to center said section on the other section.

6. In a vehicle wheel, an outer removable section including a drop center tire rim comprising laterally separable sections, said rim including laterally spaced flanges, substantially horizontal portions extending inwardly from said flanges, laterally spaced substantially parallel side portions extending inwardly from the inner edges of said second portions and a substantially horizontal bottom and central portion extending between the inner edges of said radial portions and in which the line of separation between the sections is located, brackets secured to said central portion and extending transversely between said radial portions and forming seats for said portions on the opposite ends thereof, bolts extending through said brackets and radial portions to detachably secure said sections together, a central supporting web having a horizontal flange secured to the inner side of said bottom portion, and said line of separation being spaced inwardly from the edge of said flange on the web so that the bottom portion on the removable section of the rim overlaps said flange to center said removable section thereon.

7. In a vehicle wheel, an outer removable section including a drop center tire rim comprising spaced side flanges which are laterally separable between the flanges to permit removal of a tire, substantially horizontal portions extending inwardly from said flanges, laterally spaced substantially parallel portions extending radially inward from the inner edges of said second portions and a substantially horizontal central portion extending between the inner edges of said radial portions in which the line of separation is located, said central portion being looped outwardly at spaced intervals to form brackets extending between the radial portions and forming seats at their opposite ends for said radial portions, and bolts extending transversely through said brackets and the said radial portions to clamp said portions against the ends of the brackets and to detachably secure the flanges together.

8. In a vehicle wheel, an outer removable section including a drop center tire rim comprising laterally separable sections, said rim including laterally spaced flanges, substantially horizontal portions extending inwardly from said flanges, laterally spaced substantially parallel side portions extending inwardly from the inner edges of said second portions and a substantially horizontal bottom and central portion extending between the inner edges of said radial portions and in which the line of separation between the sections is located, said central portion having spaced openings therein extending transversely between the side portions, a central supporting web having a horizontal flange secured to the inner side of said central portion, said latter flange being looped outwardly at spaced intervals to extend through said openings in the central portion to form brackets extending between the side portions and forming seats at their opposite ends for said side portions, and bolts extending transversely through said brackets and the said side portions to clamp said portions against the ends of the brackets and to detachably secure the brackets together.

9. In a vehicle wheel, an outer removable section including a drop center tire rim comprising rim sections including spaced side flanges and which are laterally separable between the flanges to permit removal of a tire, substantially horizontal portions extending inwardly from said flanges, laterally spaced substantially parallel portions extending radially inward from the inner edges of said second portions and a substantially horizontal central portion extending between the inner edges of said radial portions in which the line of separation is located, spaced brackets between said radial portions and integral with one rim section, and bolts extending transversely through said brackets and the said radial portions to detachably secure the flanges together.

CASIMIRO FERRO.